May 30, 1933. B. T. BROOKS 1,911,795
TREATMENT OF CRUDE PETROLEUMS
Filed Feb. 13, 1928
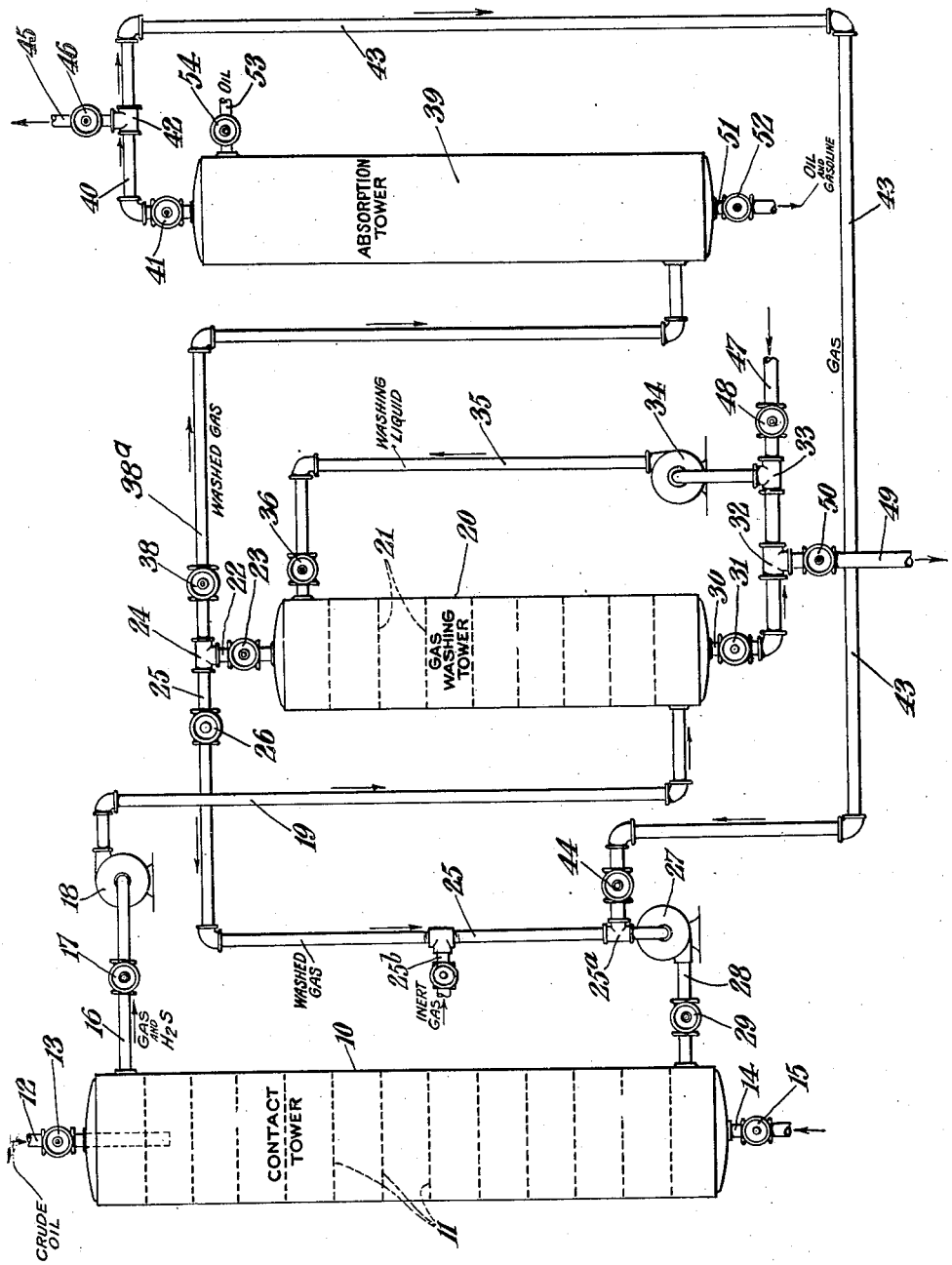

Patented May 30, 1933

1,911,795

UNITED STATES PATENT OFFICE

BENJAMIN T. BROOKS, OF SOUND BEACH, CONNECTICUT, ASSIGNOR TO THE GRAY PROCESSES CORPORATION, OF NEWARK, NEW JERSEY, A CORPORATION OF DELAWARE

TREATMENT OF CRUDE PETROLEUMS

Application filed February 13, 1928. Serial No. 253,812.

This invention relates to improvements in the treatment of crude petroleums, and has for an object to remove hydrogen sulfide from crude petroleum expeditiously and inexpensively.

Many crude petroleums as they issue from the wells contain dissolved hydrogen sulfide, which is slowly liberated from the oil obtained from such petroleums when kept in storage tanks and other containers, and in many fields the crude oils contain so much of this gas as to constitute a source of danger to life. It is also the chief cause of the corrosion of much iron and steel equipment, since in the presence of hydrogen sulfide and moisture or salt water, the corrosion of pipe lines, storage tanks and other containers is unusually rapid.

The treatment of crude petroleum for the removal of hydrogen sulfide at a reasonably low cost has heretofore been a very troublesome problem. Crude petroleums containing hydrogen sulfide also contain asphaltic matter and emulsified salt water, with the result that, when it is attempted to remove the dissolved hydrogen sulfide with lime, caustic soda, sodium carbonate or other alkalies, the lime and magnesia salts present in the salt water are precipitated and a very troublesome emulsion results. Moreover, when it is attempted to wash out the hydrogen sulfide with water, large volumes of water are required, and probably due to the asphaltic matter in the oil and the nature of the emulsified salt water contained in the oil, voluminous and troublesome emulsions are formed. The present invention circumvents these difficulties and at the same time permits the removal of hydrogen sulfide to be carried out in relatively simple and inexpensive apparatus, so that the crude oil may be treated in the fields where it is produced and before it is placed in storage tanks or pumped through the costly trunk pipe lines. The particular utility of the invention is in making safe the areas about storage tanks containing crude oil and in preventing or reducing the corrosion of iron or steel equipment.

The present invention consists essentially in washing out the dissolved hydrogen sulfide by a counter-current stream of gas, together with agitation of the oil to facilitate the operation. Many crude oils are charged with hydrogen sulfide under the relatively high gas pressures prevailing in oil bearing strata, which probably accounts for the relatively large proportions of hydrogen sulfide present in some crude oils. I have discovered that, when such crude petroleums are pumped into the top of a tall tower containing baffle plates or other obstructions and the oil caused to flow downwardly over these plates so that it is thoroughly agitated, much of the hydrogen sulfide and other dissolved gases is liberated. For the complete removal of the hydrogen sulfide, it is usually necessary to introduce, in addition to the hydrocarbon gases liberated by the crude oil itself, additional gases, such as air, inert gases, or incondensable gases derived from prior agitation treatment of a crude petroleum, and to direct such gas upwardly and counter-current to the descending flow of crude oil which is undergoing treatment. In exceptional cases, where the relative amount of hydrogen sulfide is small and the proportion of dissolved so-called incondensable gases, such as methane, ethane and propane, is relatively large, the hydrogen sulfide can be reduced to a safe percentage merely by agitation without passing any extraneous gas. However, the counter-current circulation of extraneous gas is remarkably effective owing to the incremental removal of hydrogen sulfide at successively lower stages of the tower, and it is usually necessary to introduce such extraneous gas in order to obtain satisfactory results.

The gas mixture containing hydrogen sulfide is withdrawn from the top of the treating tower and is then passed through a scrubbing system, in which the hydrogen sulfide is removed preferably by passing the gas mixture through milk of lime or other alkali or, in exceptional cases, where large volumes of water are available, through water, thus removing the hydrogen sulfide without the formation of troublesome emulsions or experiencing any other difficulty. The gas mixture, after removal of the hydrogen sulfide, may contain considerable condensable gasoline vapor, for the recovery of which, in the case of heavy or low Baumé gravity crudes, it is sufficient to pass the gas back into the bottom of the baffle plate tower against the descending stream of crude oil. In some cases, and usually with very light crude oils, it is advisable to pass the gas after removal of the hydrogen sulfide through a suitable apparatus for the recovery of the gasoline vapors, after which all or a part of the residual gas is passed to the bottom of the baffle plate tower for use in washing the crude oil. There is practically always a surplus of incondensable gas consisting essentially of methane and smaller proportions of other hydrocarbons, so that during the operation of the process, the purified gas not required for the gas washing of the crude may be removed from the system and disposed of as desired. The recovery of the gasoline vapor is not essential for the successful removal of hydrogen sulfide, since, when the gas is circulated through the system, the gasoline vapors escaping with hydrogen sulfide and other gases from the treating tower are in part reabsorbed by the crude oil when the residual desulphurized gas is introduced into the bottom of the tower. In cases where the separation of gasoline as such from the circulating gas stream may not be desirable, it may be completely put back into the crude oil by compressing the gas to a moderate pressure, preferably about 100 pounds to the square inch, and passing the desulphurized gas under this pressure into the bottom of a second tower, used as an absorption tower, and into the top of which crude oil previously stripped of hydrogen sulfide in another tower is introduced.

If the gases liberated from the crude petroleum are cooled and compressed or otherwise treated for the removal of gasoline vapors without first removing the hydrogen sulfide, a portion of the latter will be removed with the gasoline, and although this procedure is not very efficient and merely translocates the removal of the hydrogen sulfide thus dissolved in the gasoline to a subsequent operation, this procedure is within the spirit of the invention.

The internal construction of the gas washing tower may be varied according to well-known chemical engineering principles. Towers having sections or trays of bubble caps of the type commonly known in the art as bubble towers may advantageously be employed, and have the advantage, where separate recovery of gasoline vapors is not effected, of causing a pressure on the bottom sections of the tower equal to the hydrostatic head of the combined depth of liquid on the bubble plates of the tower. However, this pressure operates against the complete removal of hydrogen sulfide by the gas washing process, and a scrubbing system which does not build up such a pressure is preferable. In face, a partial vacuum facilitates the removal of the hydrogen sulfide, but this procedure also removes much greater proportions of gasoline vapor, and for this reason is less desirable. The descending stream of oil may be agitated and subjected to the washing action of the ascending gas current by flowing over broken tile, stoneware rings, or other similar material, instead of flowing over baffle plates. A tower about forty feet high by about eighteen to twenty-four inches in diameter and containing about twenty-five baffle plates successfully treats upwards of one thousand barrels of crude oil per day.

The hydrogen sulfide may also be washed out by pumping the crude oil through a series of relatively tall vessels, through which a stream of gas is pumped or bubbled counter-current to the general direction of flow of the oil. The principles of the process are in general the same, the chief difference being that in the latter method the bulk of the space within the apparatus is filled with oil through which the gas is bubbled. The incremental and progressive removal of hydrogen sulfide from the crude oil, the subsequent separation of the hydrogen sulfide, and the recovery or reintroduction of the gasoline vapors into crude oil, are in general the same.

Other objects, novel features and advantages of this invention will be apparent from the following specification and accompanying drawing, wherein the single figure discloses diagrammatically an apparatus for treating crude petroleum in accordance with this invention.

10 designates the treating tower equipped with a plurality of slotted baffle plates 11. A pipe 12, controlled by a valve 13, is provided for introducing oil into the tower, and a pipe 14, controlled by a valve 15, is provided for removing oil from the tower. A pipe 16, controlled by a valve 17, leads from the top of the tower 10 to the inlet of a pump 18, from the outlet of which a pipe 19 leads to the bottom of a tower 20 provided with a plurality of slotted baffle plates 21. A pipe 22, controlled by a valve 23, leads to a T 24, to one arm of which is connected a pipe 25, controlled by a valve 26, and leading through a T 25$^a$ to the inlet of a pump 27, the outlet of which is connected by a pipe 28, controlled by a valve 29, with the bottom of the tower 10. A valve controlled pipe 25$^b$ connects with the pipe 25.

A pipe 30, controlled by a valve 31, leads through the T's 32 and 33, to the inlet of a pump 34, the outlet of which is connected by a pipe 35, controlled by a valve 36, with the top of the tower 20. A pipe 38$^a$, controlled by a valve 38, leads from the remaining arm of the T 24 to the bottom of an absorption tower 39. From the top of the tower 39, a pipe 40, controlled by a valve 41, leads to a T 42, from which a pipe 43, controlled by a valve 44, leads to the T 25ª. A pipe 45, controlled by a valve 46, leads from the T 42. A pipe 47, controlled by a valve 48, leads to the T 33, and a pipe 49, controlled by a valve 50, leads from the T 32. A pipe 51, controlled by a valve 52, leads from the bottom of the absorption tower 39.

Crude oil is fed into the tower 10 through the pipe 12, and after passing over the baffle plates 11, is discharged from the tower through the pipe 14. Such agitation liberates hydrogen sulfide gas and other gases dissolved in the oil, which gases are removed through the pipes 16 and 19 and delivered to the bottom of the washing tower 20. A washing fluid, such as a solution of milk of lime or other alkali, is introduced into the top of the tower 20 through the pipe 35 and separates the hydrogen sulfide gas from the other gases. By proper arrangement of the valves 31, 36, 48 and 50, the washing fluid may be caused to circulate through the tank 20. Fresh washing fluid may be added by opening the valve 48, and spent washing fluid may be removed from the system by opening the valve 50. The incondensable gases may be led from the tower 20 through the pipe 38a to the absorber 39, where they may be freed of their gasoline content by an absorption medium introduced into the tank through the pipe 53, controlled by the valve 54, after which they may be safely vented to the atmosphere through the pipe 45 or utilized as natural gas. The absorption medium is drained out through the pipe 51 and disposed of as desired.

To thoroughly liberate hydrogen sulfide from the crude oil, a stream of incondensable gas may be introduced into the bottom of the tower 10 through the pipe 28 and caused to flow upwardly through the descending stream of oil. The valved pipe 25ᵇ permits introduction into the system of any suitable inert gas or the like, as desired. In such event, a portion of the incondensable gas discharged from the tower 20, after the hydrogen sulfide has been removed, is returned by way of the pipe 25 to the bottom of the tower 10. Likewise, a portion of the incondensable gas discharged from the absorber 39 is returned by way of the pipe 43 to the bottom of the tower 10. Sufficient incondensable gas is vented through the pipe 45 to compensate for the incondensable gas liberated from the crude oil with the hydrogen sulfide.

The hydrogen sulfide is removed from the crude petroleum by a circulating stream of incondensable gases, and is then removed from such gases, after which the latter are utilized to absorb additional hydrogen sulfide from fresh crude oil. The volatile hydrocarbon vapors which may be carried off with the incondensable gases are recovered after the hydrogen sulfide has been washed from the incondensable gases, and may be returned to the crude oil, if desired. In any event, the hydrogen sulfide is removed from the crude oil expeditiously and inexpensively by means of simple and inexpensive apparatus.

I claim:

1. The process of treating crude petroleum oil containing hydrogen sulphide and fixed hydrocarbon gases which comprises separating gases from a flowing stream of said oil, treating said gases to remove hydrogen sulphide therefrom, and recycling at least a portion of the remaining gases through said oil stream countercurrent thereto.

2. The process of treating crude petroleum oil containing hydrogen sulphide and fixed hydrocarbon gases which comprises flowing a stream of said oil downwardly through a confined space, separating gases from said oil during passage thereof through said space, treating said gases to remove hydrogen sulphide therefrom, and supplying a portion at least of the remaining gases to the bottom of said confined space.

3. The process of treating crude petroleum oil containing hydrogen sulphide and fixed hydrocarbon gases which comprises flowing a stream of said oil into contact with baffle plates and separating gases from the oil, treating said gases to remove hydrogen sulphide and recycling at least a portion of the remaining gases through said stream countercurrent thereto.

4. The process of treating crude petroleum oil containing hydrogen sulphide and fixed hydrocarbon gases which comprises flowing a stream of said oil downwardly through a confined space and in contact with baffles, separating gases from the oil during passage thereof through said space, treating said gases to remove hydrogen sulphide therefrom and supplying a portion at least of the remaining gases to the bottom of said confined space.

In testimony whereof, I have signed my name to this specification.

BENJAMIN T. BROOKS.